Figure 1:
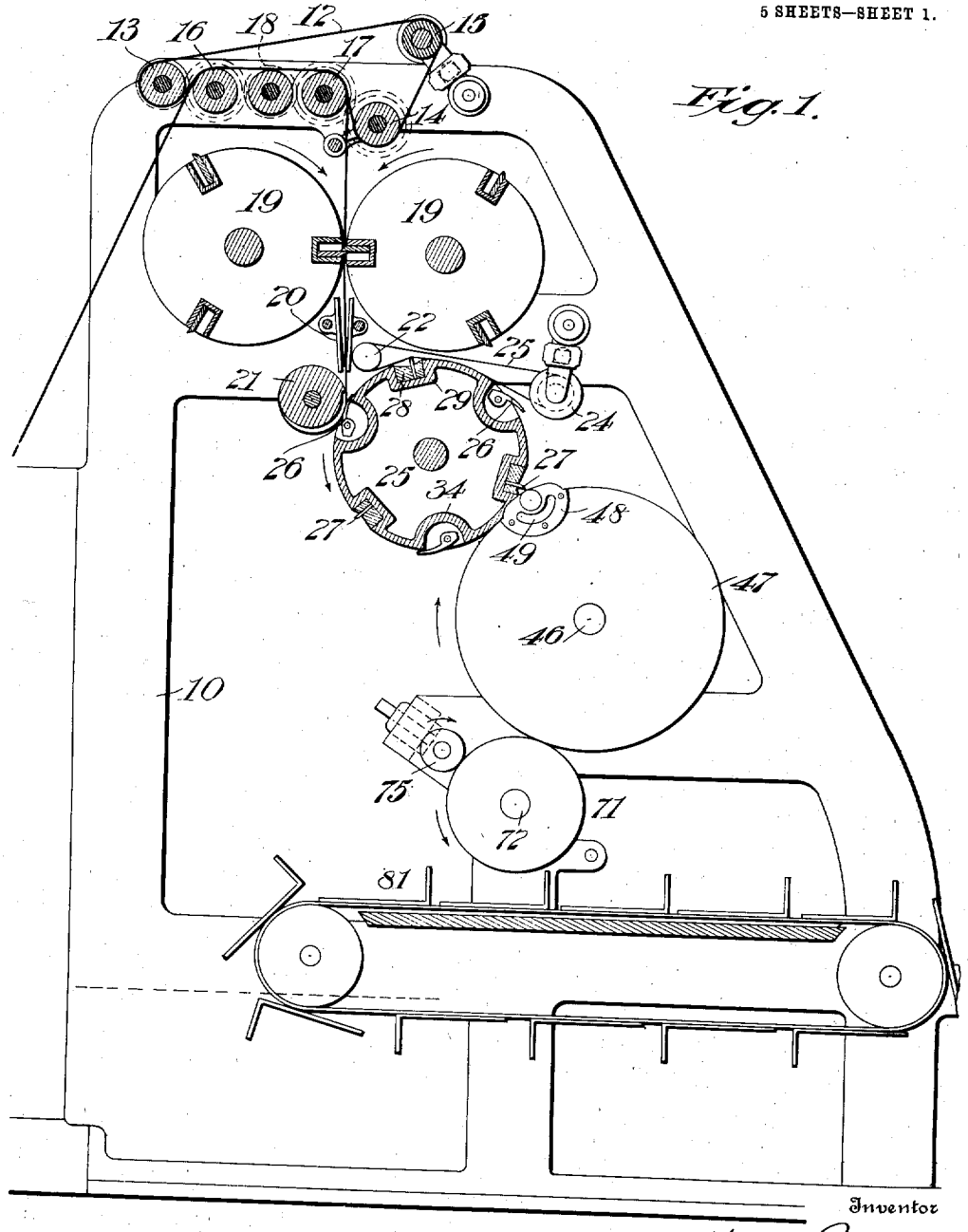

H. M. BARBER.

COLLECTING AND FOLDING MACHINE.

APPLICATION FILED MAR 25, 1909.

Reissued May 25, 1909.

12,958.

5 SHEETS—SHEET 1.

Inventor

H. M. Barber

Witnesses

P. L. Moschene

D. D. Pierpont

By

Walter F. Rogers

Attorney

H. M. BARBER.

COLLECTING AND FOLDING MACHINE.

APPLICATION FILED MAR 25, 1909.

Reissued May 25, 1909.

12,958.

5 SHEETS—SHEET 2.

Witnesses

P. L. Mochlin

D. V. Pierpoint

By

Inventor

H. M. Barber

Albert E. Rogers

Attorney

H. M. BARBER.

COLLECTING AND FOLDING MACHINE.

APPLICATION FILED MAR 25, 1909.

Reissued May 25, 1909.

12,958.

5 SHEETS—SHEET 3.

Witnesses

P. L. Moodaber

D. V. Pierpoint

Inventor

H. M. Barber

By

Walter F. Rogers

Attorney

H. M. BARBER.

COLLECTING AND FOLDING MACHINE.

APPLICATION FILED MAR 25, 1909.

Reissued May 25, 1909. 12,958.

5 SHEETS—SHEET 4.

Witnesses
T. L. Mockoson
D. V. Pierpoint

By

Inventor
H. M. Barber
Walter F. Rogers
Attorney

H. M. BARBER.

COLLECTING AND FOLDING MACHINE.

APPLICATION FILED MAR 25, 1909.

Reissued May 25, 1909.

12,958.

5 SHEETS—SHEET 5.

Witnesses

T. L. Mockabee

D. V. Pierpoint.

Inventor

H. M. Barber

By Walter T. Rogers,

Attorney

UNITED STATES PATENT OFFICE.

HOWARD M. BARBER, OF STONINGTON, CONNECTICUT, ASSIGNOR TO C. B. COTTRELL & SONS COMPANY, OF NEW YORK, N. Y., A CORPORATION OF NEW JERSEY.

COLLECTING AND FOLDING MACHINE.

No. 12,958. Specification of Reissued Letters Patent. Reissued May 25, 1909.

Original No. 879,721, dated February 18, 1908, Serial No. 378,392. Application for reissue filed March 25, 1909. Serial No. 485,866.

*To all whom it may concern:*

Be it known that I, HOWARD M. BARBER, a citizen of the United States, residing at Stonington, in the county of New London and State of Connecticut, have invented certain new and useful Improvements in Collecting and Folding Machines; and I do hereby declare the following to be a full, clear, and exact description of the invention, such as will enable others skilled in the art to which it appertains to make and use the same.

My invention relates to printing presses, and especially to associating and folding mechanisms.

It is an improvement in web-perfecting printing presses in which rapidly running webs of paper may be successively cut into sheets or sections of given size, cross-folded after the superposing of one sheet upon another on the surface of a collecting cylinder and then carried to slitting and delivery devices which cut the sheets into the desired folios, the combined adjunctive mechanism constituting what is commercially termed a high-speed ninety-six page magazine folder.

I collect four sheets on each of three sections of a collecting cylinder and then fold each one of the sets of four sheets in succession into another cylinder, a folding cylinder, from which they are delivered by a slitting and delivery cylinder to traveling receiving pockets or similar devices. The collecting cylinder carries a series of stationary tucking or folding blades, three in the illustration shown, the edges of the blades being in or coincident with the pitch line of the periphery of the collecting cylinder. The folding cylinder receives each set of four sheets between sets of grippers and an opposing jaw section. The jaw of the folding cylinder is carried by bearings whose centers are on the pitch line of the folding cylinder gear. The outer edge of the jaw in action is projected beyond that pitch line, or what, for convenience, may be termed the pitch line of the periphery of the folding cylinder, a sufficient distance to impart a fold to each successive set of four sheets taken from the collecting cylinder, nipping the sheets when the folding blade of the collecting cylinder and the jaw of the folding cylinder are on a line between the centers of the cylinders, or upon what may be termed the same radial line, and carrying the folded sheets from this point to the delivery cylinder. At the moment of action in taking the sheets from the collecting cylinder the jaw is projected beyond the pitch line of the periphery of the folding cylinder practically to the full amount of the fold. At other times during the travel of the cylinder the jaw projects slightly beyond the pitch line of the periphery of the cylinder except at the instant when it is delivering the sheets to the slitting and delivery cylinder at which time the jaw is moved or "floated" inward so that it lies slightly within the plane of the periphery of the folding cylinder to enable the fold in the sheets to lie out along the same tangential lines which the body of each sheet bears with relation to the folding cylinder as it leaves it.

The arrangement of the tucking or folding blades within the periphery line of the collecting cylinder makes it possible to insert sheet-carrying pins in line with each blade so that the pins may project slightly beyond the periphery of the collecting cylinder and pierce each sheet marginally as it is received by the collecting cylinder, thus, alone or in conjunction with a tape-guard, preventing any movement of the sheets when the grippers are raised to receive the following successive sheets of the collection. By this arrangement I am able to cut sheets from the web as it comes from the press and place successive sheets on each of the sections of the collecting cylinder laying them out upon the cylinder until four sheets are superposed. Then, by having the jaw of the folding cylinder turn in an arc which will project it beyond the pitch line of the periphery of the folding cylinder and yet maintain its relative position with the folding blade during the arc of contact and as the two travel on, I draw off four sheets by the fold in a direct tangential line and carry the folded sheets around on the periphery of the folding cylinder. And, finally, by drawing in the floating jaw until its folding face or edge is upon the pitch line of the periphery of the folding cylinder, I so place the fold that when the grippers of the delivery cylinder take it the fold will be placed and received in the tangential line which it then bears to the folding cylinder.

Figure 2:
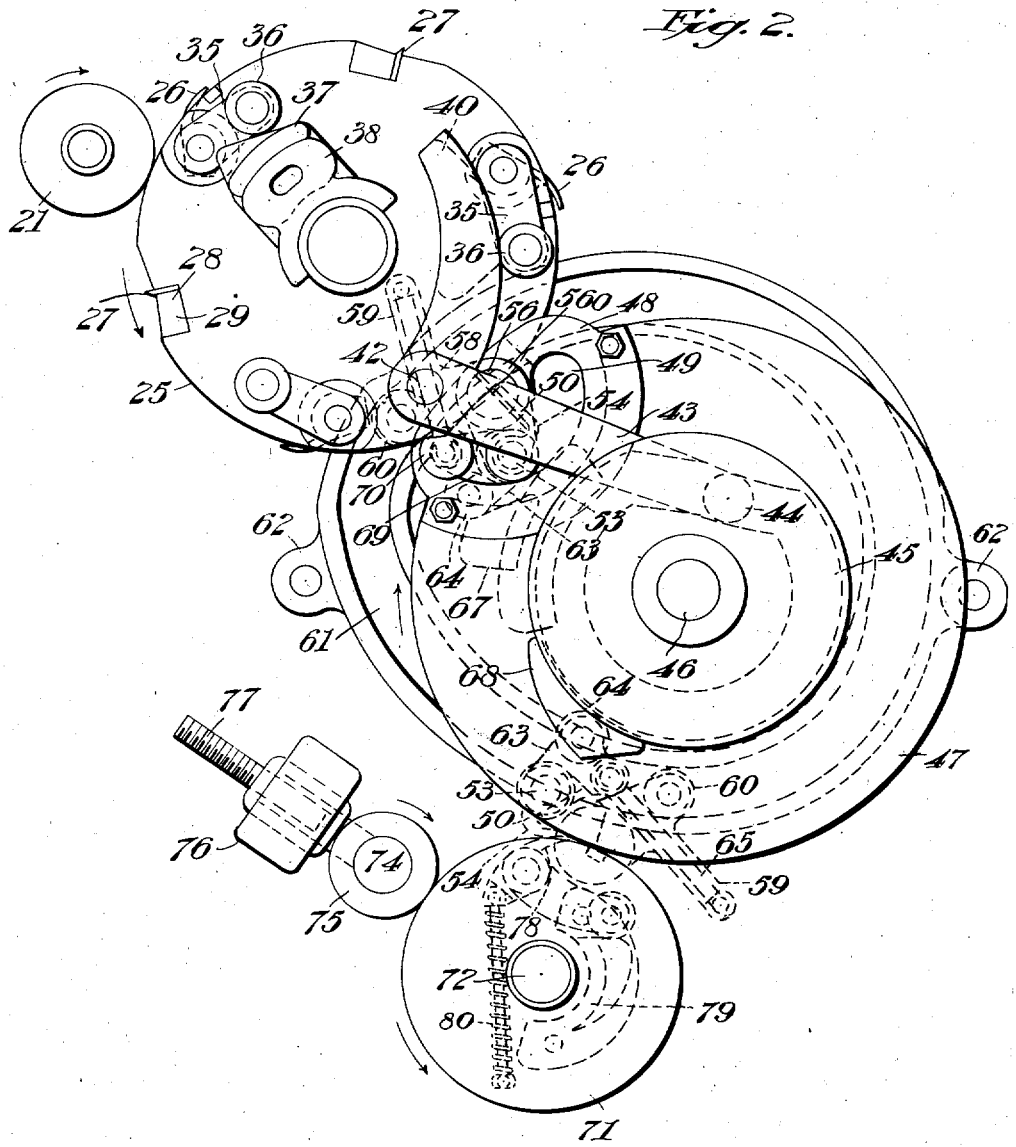
Figure 3:
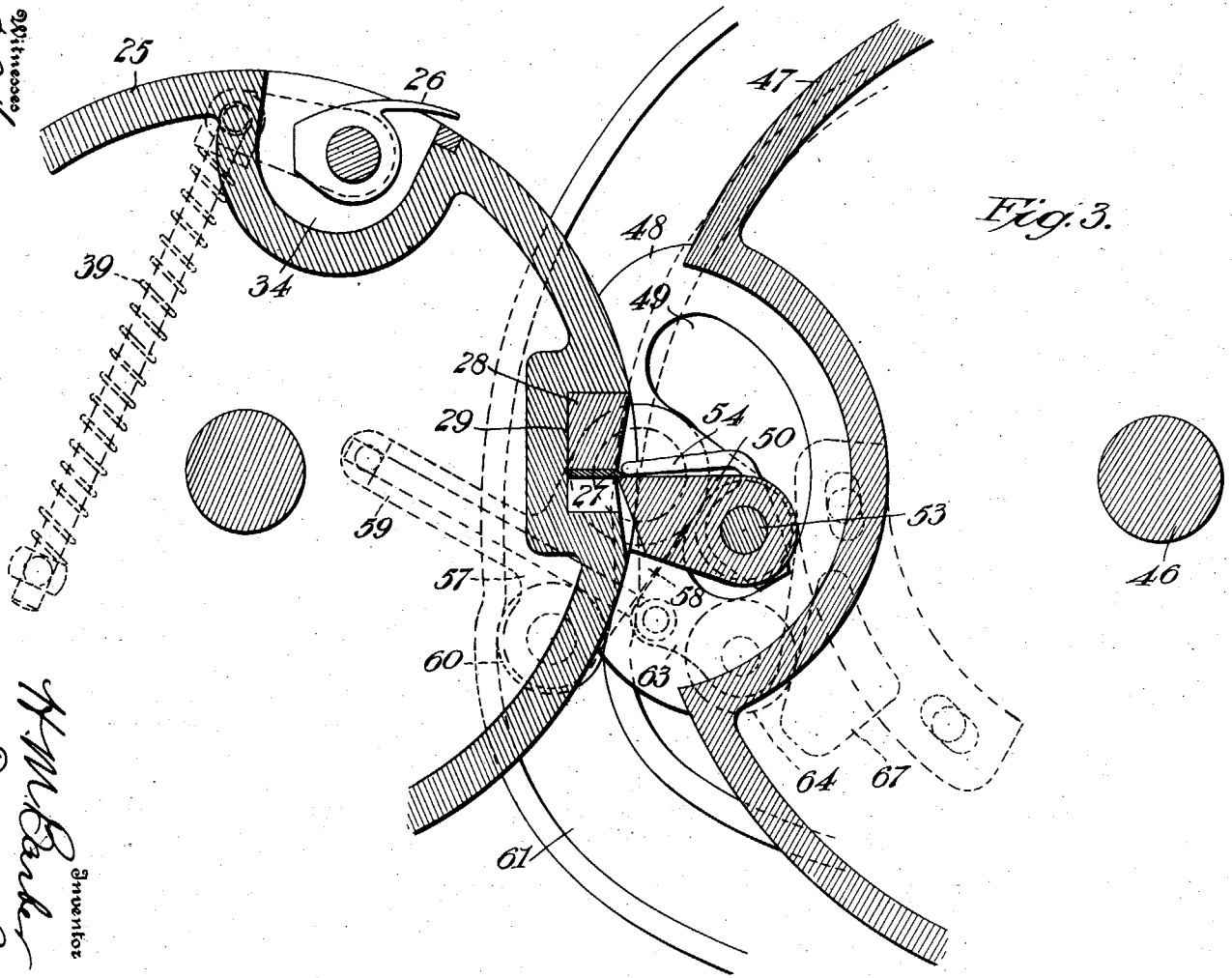
Figure 4:
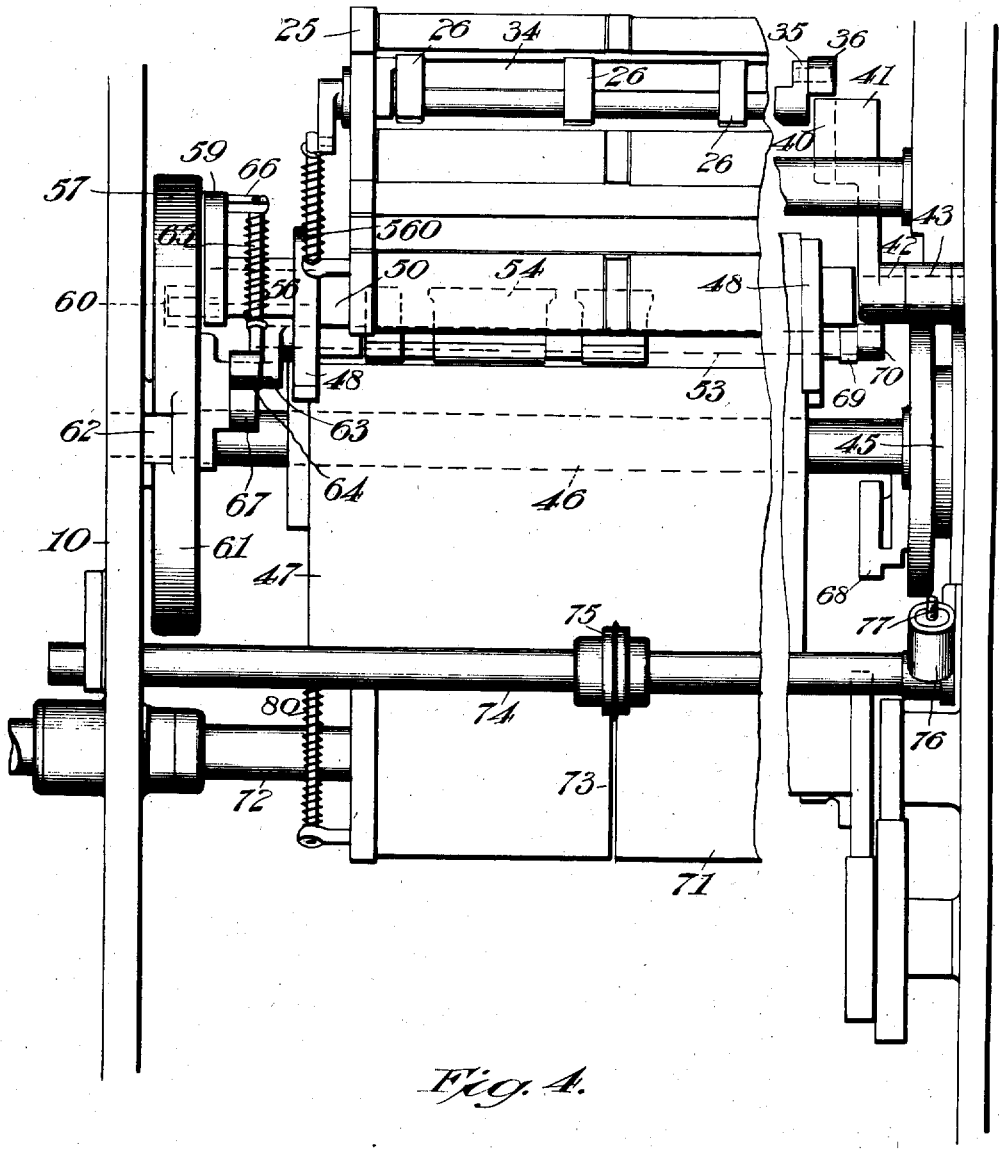
Figure 5:
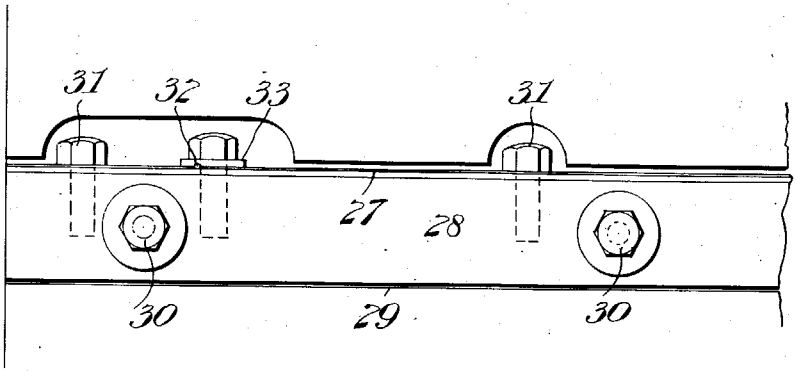
Figure 7:
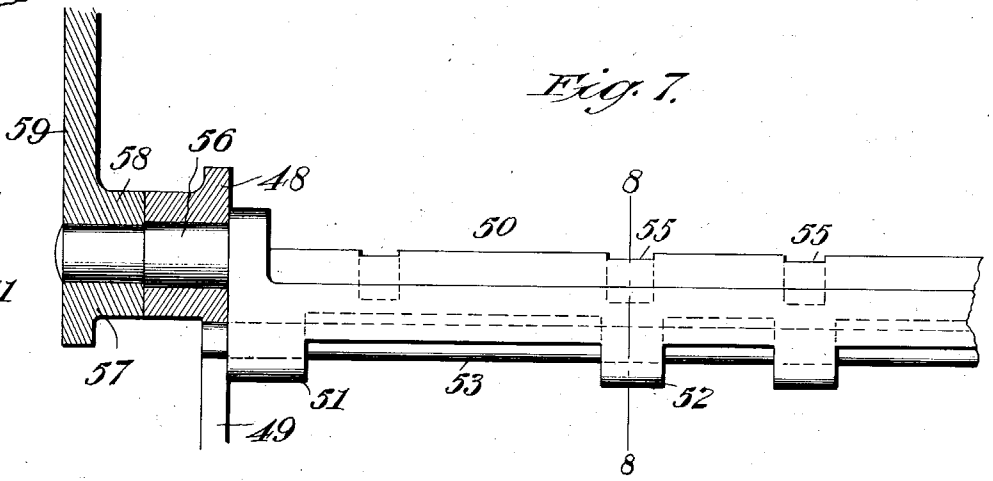
Figure 6:
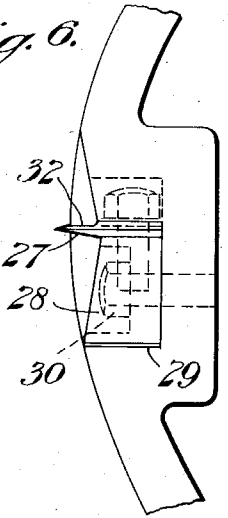
Figure 8:
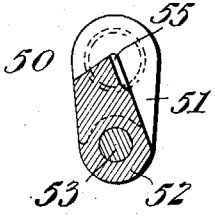

In the drawings,—Figure 1 is a diagrammatic side elevation partly in section to show the relative arrangement of the essential parts; Fig. 2 is a side elevation of tucking reel, collecting cylinder, folding cylinder, male slitters and female slitting delivery cylinder; Fig. 3 is a sectional view illustrating the relations of the tucking or folding blade, floating jaw and its grippers and associated parts, placed upon the sheet with reference to convenience of illustration; Fig. 4 is a front elevation, broken away, to indicate the relative arrangement of the operative features on opposite sides of the machine; Fig. 5 is a detail plan view representing the tucking or folding blade of the collecting cylinder and the relative arrangement of the sheet-carrying pins; Fig. 6 is a side detail also illustrating the relative arrangement of the blades and sheet-carrying pins; Fig. 7 is a detail of the floating jaw section; Fig. 8 is a detail section of the floating jaw section on the line 8—8 of Fig. 7.

In the drawings 10 represents the frame of the machine, 11 a web of paper coming from the printing press, and 12 one of the feeding tapes for the web. The tapes 12 pass around end pulleys 13, 14, and are controlled in the usual manner by tension pulleys 15.

16, 17 are web feed rolls and 18 is an intermediate gear wheel. The gear wheels of the rollers 16, 17 are thus in mesh with the gear wheel 18 while the gear of the roller 16 is in mesh with the gear-wheel of the roller 13 and the gear of the roller 17 with the gear-wheel of the roller 14. The web of paper 11 coming from the printing press passes between pulleys 13 and 16 along the bottom side of the bottom run of the tapes and thence down between the pulleys 14 and 17.

19 respresents a pair of cutter cylinders shown here as each carrying three cutting blades and operated in the usual manner to shear the sheet from the traveling web.

20 is a guide through which the sheet is guided to a tucking-reel 21 and a collecting cylinder 25. Between the cutters and the collecting cylinder 25, that is, just in advance of the tucking reel and the collecting cylinder, lies a roller 22 from which pass tapes 23 held at the other end by tension pulleys 24, constituting a tape-guard to hold the sheets in register on the collecting cylinder when the grippers are raised to receive another sheet of the collection. Sheets thus cut and delivered by this type of machine are always in register when they are placed upon the collecting cylinder.

The collecting cylinder 25, in the form illustrated, has three series of grippers 26 of the usual construction. 27 are tucking or folding blades which extend across the cylinder and whose edges lie in the plane of the pitch line of the collecting cylinder 25, as best shown in Figs. 2 and 6.

The tucking or folding blades are carried by blocks 28 which lie in pockets 29 formed in the shell of the collecting cylinder, the blades being secured by bolts as indicated at 30 and 31 in Fig. 5. Inasmuch as the edges of the tucking or folding blades are thus upon or thus traverse the pitch line of the periphery of the collecting cylinder the sheets may be laid one upon another along the cylinder surface over the blades. At appropriate points corresponding with the marginal lines of the sheet are placed sheet-carrying pins 32. One of these sheet-carrying pins is shown in Fig. 5, lying between a collar 33 and the abutting back of the blade. They project slightly beyond the blades as shown in Fig. 6. The sheets as they are successively delivered are marginally pierced by the pins which serve to maintain the register and also to hold the sheets as they are carried forward after the grippers have been released and before they again seize the leading edge of the sheets.

In Figs. 2 and 3 the grippers 26 are shown lying in the usual cavities 34, and having a rocking arm 35 with an end roller 36. The roller 36 at the gripping point runs upon a cam-block 37 which is secured to the frame of the machine and, as indicated in Fig. 2, is preferably formed so that its securing block 38 may embrace the shaft of the collecting cylinder 25. The cam-block 37 serves to open the grippers 26 to grasp the leading edge of the sheet as soon as the roller 36 has passed the cam 37 and the usual spring-arm 39 of the gripper shaft has come into operation.

In the operation of this press it is intended that the collecting cylinder shall take four sheets upon each section and that at each revolution of the folding cylinder, which is coincident with the revolution of the press, a series of four sheets shall be taken from the collecting cylinder.

The cam devices for operating the grippers 26 to open them are therefore arranged to be operated by a cam-path secured upon the shaft of the folding cylinder to be hereinafter described. To this end a cam block 40 is fixed to one side of a curved arm 41 which is joined by a stub-shaft 42, bearing in the frame of the machine, to an arm 43 which is operated by means of a roller 44 and a cam-path 45 fixed to the shaft 46 of the folding cylinder 47. The cam-path 45 is shown with a dwell so arranged that at the desired moment the block 40 is brought down into the path of the roller 36 so that the arm 35 rocks the gripper shaft and opens the grippers 26 to release the four sheets nipped by the folding-jaw and grippers of the folding cylinder.

Upon opposite ends of the folding cylinder 47 are secured two segmental bearing plates 48, each of which has an opening or path 49 in the form of an arc. 50 is a floating jaw section shown in dotted lines in Fig. 2, in sectional lines in Fig. 3, partly in elevation and partly in dotted lines in Fig. 4 and in detail in Figs. 7 and 8. The jaw-section 50 is, as indicated, preferably made up of a solid forged piece substantially in the form of a crank-shaft. It has, as indicated, ears 51 at each end and intermediate ears 52. Each ear 51 at the end bears a stub-shaft 56 and each of the ears 51 and 52 are bored to receive the shaft 53 of a set of grippers 54.

In the form illustrated the jaw is slightly cut away on its bearing face at the points 55 to form clearance for the delivery grippers to be hereinafter described. The shaft 56 of the floating jaw as shown in Figs. 2, 3 and 7 passes through the bearing plates 48 at 560 and then at one end to an operating block 57 to which it is keyed. The gripping edge of the jaw is on the line of the center of the shaft 56, this being an advantageous arrangement for the handling of the sheet. The operating block 57 is, as illustrated, composed of a base-plate 58 and an upright part 59. At the end of the plate 58 of the block 57 opposite its connection with the bearing shaft of the floating jaw is a roller 60 which travels in a cam path 61 secured to one side of the frame of the machine at 62.

The gripper sections 54 operate in conjunction with the floating jaw turning, as previously indicated, with the shaft 53 which is journaled in the ears 51 and 52 of the floating jaw. The gripper shaft 53 projects at each end into the arc 49 of the bearing plate 48. The combined floating jaw and grippers are journaled in the bearing plates 48. The extending ends of the gripper shaft 53 travel in the arcs of the bearing plates 48 as the jaw is rotated to its several positions by the action of the cam-path 61 upon the roller 60 and the operating block 57 which is keyed to an extension of the shaft 56 at one end, as shown in the principal figures and in detail in Fig. 7. The grippers 54 are, in the form illustrated, in several sections corresponding with the arrangement of the ears 51 and 52 of the floating jaw. That is to say, there is a series of wider gripper sections and a series of narrower gripper sections, as shown for example in Fig. 4. The gripper sections 54 bear toward the face of the floating jaw section 50.

63 is an arm upon the gripper-shaft 53 projecting at one side of the machine (Fig. 4) for operating the grippers 54 when making a fold, and 64 is a roller on the end of the arm 63 for operating the gripper arm. The usual spring-rod for the gripper-shaft is on the same side of the machine and, as shown at 65, is connected by a short rod 66 with the upright 59 of the operating block 57. The arm 63 and the roller 64 are operated by means of a cam 67 which is bolted to the master cam 61.

On the opposite side of the machine and lower down is secured a cam-block and upon the gripper shaft 53 is an arm 69 with a roller 70 which plays upon the cam 68 to release the grippers 54 as the sheets are carried around to the delivery cylinder.

In Figs. 2 and 4, I have illustrated the relative arrangement of the male slitters and the female slitters and the delivery cylinder. The slitting and delivery cylinder 71 is carried upon a shaft 72 journaled in the frame of the machine. In Fig. 4 I have illustrated one of a series of slits 73, it being understood that in the form of machine here illustrated there will be five of these slits so that the sheets may be cut into six folios to provide for ninety-six pages. 74 is a slitter-shaft having fixed upon it a series of slitter knives 75 secured in the usual manner upon the shaft and having the usual adjusting features as indicated at 76, 77.

I have illustrated but one of the delivery grippers 78. This may be operated by any appropriately located cam such as 79 and operated in the reverse direction by the usual spring gripper-rod 80.

In Fig. 1 I have illustrated, or rather indicated, a form of traveling belt pocket delivery 81 upon which the folios or severed sheets are placed preparatory to their discharge from the machine. I have not illustrated the gearing and other devices for driving the pocket delivery and other parts of the machine because they may be readily understood in view of the fact that they do not differ in any essential degree from the gearing commonly used in the art to drive equivalent features of press mechanism.

In operation the web of paper comes from the press over the feeding rolls 16 and 17 thence down between the cutters 19 and through the guide 20 where the severed sheet is delivered to the space between the tucking-reel 21 and the collecting cylinder 25 so that upon the revolution of the collecting cylinder in the direction of the arrow one set of the grippers 26 may play back in the groove of the tucking reel and grasping the leading edge of the sheet draw it out along the surface of the collecting cylinder impaling it at the margin upon the sheet-carrying pins 32, the sheet lying smoothly along the surface of the collecting cylinder because of the fact that the edges of the tucking or folding blades lie in or coincide with the pitch line of the periphery of the collecting cylinder.

The collecting cylinder makes one and one-third revolution for each revolution of the press while the folding cylinder of the same diameter as the impression cylinder makes one revolution for each revolution of the impression cylinder. Each sheet as it comes from the press is cut into four sections. Inasmuch as the folding cylinder makes one revolution for each four sheets there will, after the initial foldings, always be four sheets on the collecting cylinder sections to be folded off at each folding operation. For example, the first section of the collecting cylinder 25 will take number 1 sheet and that sheet will be at once folded off by the folding cylinder 47. In the meantime the second section has taken number 2 sheet and the third section will follow taking number 3 sheet, the first section number 4 sheet, the second section the next number 1 sheet. At this point the second section of the collecting cylinder will have come around into position to have the folding blade of its section worked in conjunction with the folding jaw of the folding cylinder and the two sheets upon that section will be taken off. Then the following number 2 sheet will go to the third section, number 3 to the first section, number 4 to the second section and number 1 to the third section. At this point the third section of the collecting cylinder will have come around to the position where its tucking or folding blade will work in conjunction with the folding jaw of the folding cylinder and the three sheets it has received will be folded off. Then the following number 2 sheet will go to the first section, the number 3 sheet to the second section, the number 4 sheet to the third section and the following number 1 sheet to the first section. This first section will now have its full complement of four sheets and from this point on each successive section as it comes into position for operation will have four sheets, for the succeeding second section at the time of the folding off of the first four sheets from the first section will have accumulated three sheets, while the third section will have accumulated two sheets, so that in successive rotation the second section will get its four sheets and upon the next rotation the third section will have its four sheets and upon the following rotation the first section will again have picked up four sheets ready for delivery to the folding cylinder.

Each set of four sheets is taken from the collecting cylinder 25 by the jaw 50 and the gripper sections 54. While, for convenience, I have occasionally referred to the part 50 as the folding jaw and the sections 54 as grippers it is apparent that these features may be said to constitute a pair of co-acting gripping jaws, both of the jaws having a common axis of motion on the folding cylinder and both having a movement independent of the rotation of the folding cylinder which carries them, one part having also a movement to and from the other part. That is to say, the folding cylinder rotates carrying the coacting pair of jaws. As the projecting jaws approach what may be termed the radial line of the folding or tucking blade of the collecting cylinder they are separated as the result of the preceding delivery action. As the tucking or folding blade is embraced by the pair of jaws one of the jaws, which I have termed the gripper, closes upon the consequent fold of paper toward the opposing jaw, and the jaws rotating upon their axis, project their edges or faces beyond the pitch line of the periphery of the folding cylinder and as they turn in an arc maintain the relative radial line until that radial line moving with the collecting cylinder corresponds with the tangential line of the folding cylinder. The sheets are then drawn from the collecting cylinder, the jaws drawing in somewhat and traveling on projected slightly beyond the periphery of the cylinder until they reach the point of contact with the delivery cylinder when they are drawn in until they are in the pitch line of the periphery of the folding cylinder and hold the fold on the tangential line of the folding cylinder. Thus the sheets are taken and delivered without bending the fold.

The closing of the gripper sections 54 upon the opposed jaw-section 50 is effected by the contact of the roller 64 of the arm 63 with the cam 67. The "floating" action of the jaws is effected by the roller 60 traveling in the cam-path 61. Inasmuch as the roller 60 is secured to the plate 58 of the operating block 57 it will swing the folding jaw to which the operating block 57 is keyed through the required arc to give it the required relative location to the tucking or folding blades 27 and delivery cylinder 71.

The cam-path 61 which governs the consequent motion of the jaw in the bearing plates 48, through roller 60 and operating block 57, is planned with reference to the sweep of the adjacent tucking or folding blade 27 while it lies within the pair of jaws. The cam-path 61, as stated, draws in the jaws slightly until they reach the contact point with the delivery cylinder 71 when the jaws are drawn in until their edges lie in the pitch line of the folding cylinder 25. Then the gripper sections 54 are released by the action of the roller striking the cam 68 and the grippers 78 of the delivery cylinder closing upon the fold of the sheets they are drawn off to the delivery cylinder 71 where by the action of the slitter-knives 75 registering with the slits 73 in the cylinder they are cut into 6–16 folios and finally delivered to the pocket-belt.

It will be observed that the edges of the tucking or folding blades and folding jaws describe a figure which, in this illustration, is substantially circular, but which, it is obvious, may have wide geometrical variations. I have, therefore, in certain of the claims, used as an appropriate relative term the word "orbit", synonymous with such terms as "path," "endless path," "track," etc.

During the folding period or the time of co-action between a folding or tucking blade and the folding jaws the active surfaces of the tucking or folding blade and of the folding jaws may be said to be in parallelism to thus briefly indicate the relation of co-action to which these parts are brought to enable the jaws to grasp or take a sheet.

Having fully described my invention what I claim is,—

1. The combination of a sheet-collecting cylinder having a relatively fixed tucking blade, a folding cylinder having a jaw, and means for causing the jaw to project beyond the periphery of the folding cylinder to grasp the sheet about the tucking blade.

2. The combination of a sheet-collecting cylinder having a tucking blade whose edge does not project beyond the pitch line of the periphery of the collecting cylinder, a folding cylinder having a jaw, and means for projecting the jaw beyond the pitch-line of the periphery of the folding cylinder at the time of taking the sheet.

3. The combination of a sheet-collecting cylinder having a plurality of relatively fixed tucking blades, a folding cylinder bearing a pair of co-acting gripping jaws, and means for projecting the gripping jaws into the collecting cylinder to successively grasp the sheets in a fold about the edges of the several tucking blades.

4. The combination of a collecting cylinder bearing folding or tucking blades, a folding cylinder bearing a jaw, and a delivery cylinder, with means for projecting the jaw at the point of taking the sheets from the collecting cylinder, partially withdrawing it during the succeeding movement of the folding cylinder, and drawing it in to lie in the pitch line of the periphery of the folding cylinder at the point of delivering the sheets.

5. In a printing press, a collecting cylinder receiving a plurality of sheets, having relatively fixed tucking blades and pins on the tucking blades which pierce and hold in register the successive sheets.

6. In a printing press, a collecting cylinder, means for supplying successive sheets to the cylinder in register, tucking blades in the cylinder and pins secured to the blades to hold in register the successive sheets.

7. The combination of a sheet-collecting cylinder having a relatively fixed tucking blade whose edge does not project beyond the pitch line of the periphery of the collecting cylinder, grippers for initially carrying the sheets by their leading edges, a folding cylinder having a jaw, and means for causing the jaw to project to grasp the sheet, and pins secured to the tucking blades projecting beyond the pitch line of the periphery of the collecting cylinder and serving to maintain the register of the sheet and to hold the sheet while it is carried forward after it is released by the grippers and before it is taken again by the grippers.

8. In a printing press, a collecting cylinder having relatively fixed folding blades whose edges do not project beyond the pitch line of the periphery of the collecting cylinder, and sheet-carrying pins secured to the folding blades and projecting beyond the pitch line of the periphery of the collecting cylinder.

9. In a printing-press, a collecting cylinder receiving a plurality of sheets and having grippers, relatively fixed tucking blades, and pins which pierce and hold in register the successive sheets.

10. The combination of one or more tucking or folding blades traveling in an orbit, folding jaws traveling in an orbit, and means for projecting the jaws to a point within the orbit of a blade at the time of the folding operation to grasp a sheet about the edge of the blade.

11. The combination of a cylinder having one or more tucking or folding blades so placed that the edge of a blade does not project beyond the pitch line of the periphery of the cylinder, folding jaws traveling in an orbit, and means for projecting the jaws to a point within the pitch line of the periphery of the cylinder for co-action with a blade.

12. The combination of a cylinder having one or more tucking or folding blades so placed that the edge of a blade does not project beyond the pitch line of the periphery of the cylinder, folding jaws, a rotary support for the jaws and means for projecting the jaws into the cylinder to grasp a sheet in a fold about the edge of a blade.

13. The combination of a cylinder having one or more tucking or folding blades so placed that the edge of a blade does not project beyond the pitch line of the periphery of the cylinder, folding jaws traveling in an orbit and means for bringing the jaws into and out of parallelism with a blade and for projecting the jaws into the cylinder at the time of folding for grasping a sheet in a fold about the edge of the blade.

14. The combination of one or more tucking or folding blades, traveling in an orbit, folding jaws traveling in an orbit, and means for bringing the jaws into and out of parallelism with a blade and for protecting the jaws to a point within the orbit of a blade at the time of folding to grasp a sheet about the edge of the blade.

15. The combination of a cylinder having one or more tucking or folding blades so placed that the edge of a blade does not project beyond the pitch line of the periphery of the cylinder, folding jaws, a rotary support therefor, and means for bringing the jaws into and out of parallelism with a blade and for projecting the jaws into the cylinder at the time of folding for grasping a sheet in a fold about the edge of the blade.

In testimony whereof I have hereunto signed the specification in the presence of two witnesses.

HOWARD M. BARBER.

Witnesses:

A. R. STILLMAN,

G. BURDICH.